United States Patent [19]

Lee

[11] Patent Number: 5,598,588
[45] Date of Patent: Feb. 4, 1997

[54] CYCLING HELMET

[75] Inventor: Ben H. Lee, Seoul, Rep. of Korea

[73] Assignee: Simmons International Korea Ltd., Seoul, Rep. of Korea

[21] Appl. No.: 544,551

[22] Filed: Oct. 18, 1995

[30] Foreign Application Priority Data

Sep. 5, 1995 [KR] Rep. of Korea .............. 95-23977

[51] Int. Cl.⁶ .................................................. A42B 3/02
[52] U.S. Cl. ........................................................ 2/421
[58] Field of Search ................... 2/410, 411, 421, 2/422, 425, 414

[56] References Cited

U.S. PATENT DOCUMENTS

| | | | |
|---|---|---|---|
| 4,653,123 | 3/1987 | Broersma | 2/425 |
| 4,995,117 | 2/1991 | Mirage | 2/410 |
| 4,996,724 | 3/1991 | Dextrase | 2/411 |
| 5,010,598 | 4/1991 | Flynn et al. | 2/410 |
| 5,123,121 | 6/1992 | Broersma | 2/421 |
| 5,231,703 | 8/1993 | Garneau | 2/425 |
| 5,291,880 | 3/1994 | Almovist et al. | 2/422 |
| 5,351,341 | 10/1994 | Broersma | 2/421 |
| 5,351,342 | 10/1994 | Garneau | 2/425 |
| 5,450,631 | 9/1995 | Egger | 2/425 |
| 5,477,563 | 12/1995 | Gentes et al. | 2/411 |

*Primary Examiner*—Michael A. Neas
*Attorney, Agent, or Firm*—Birch, Stewart, Kolasch & Birch, LLP

[57] ABSTRACT

A cycling helmet preventing a chin strap from being exposed at the top of the helmet for reducing the air resistance is disclosed. In order to couple the strap to the helmet body, a tunnel is formed by a strap guide member, such as a pipe, set in the helmet body of polyurethane foam. This guide member is positioned in its place in a mold while foaming the polyurethane foam. Alternatively, the tunnel may be formed by positioning a core applied with a parting agent in the polyurethane foam while forming the helmet body and drawing the core out of the helmet body after forming the helmet body. As a further alternative, a snap buckle receiver may be integrally formed in each side edge of the helmet body. In this case, a snap buckle is coupled to an end of the chin strap which snaps into the buckle receiver.

3 Claims, 6 Drawing Sheets

CYCLING HELMET

BACKGROUND OF THE INVENTION

1. Field of the Invention

The present invention relates in general to cycling helmets and, more particularly, to a structural improvement in such helmets not only for minimizing air resistance, but also for improving the appearance of the helmet by preventing the helmet chin strap from being exposed at the top of the helmet.

2. Description of the Prior Art

As well known to those skilled in the art, shock absorbers for cycling helmets are typically formed of styrofoam (polystyrene foam) or polyurethane foam.

A typical cycling helmet having an inner shock absorber made of styrofoam is shown in FIG. 1. In this helmet, the shock absorber is formed of styrofoam into the shape of the helmet. The above shock absorber forms a helmet body 10. A chin strap 11 is coupled to the helmet body 10 prior to covering the top of the body 10 with a thin PVC cap 12. After covering the body 10 with the cap 12, a bonding tape 13 is applied to the edge of the cap 12 so as to attach the cap 12 to the body 10.

That is, the above cycling helmet with the shock absorbing helmet body 10 of styrofoam is produced by attaching the separately formed PVC cap 12 to the helmet body 10 using the tape 13. In this type of helmet, the chin strap 11 is not exposed outside the helmet's top thereby being profitable in view of reducing the air resistance. However, the above helmet has a significant defect. That is, it is very difficult to securely attach the PVC cap 12 to the helmet body 10 using the tape 13. The cap 12 may be thus undesirably separated from the body 10 thereby not only causing rattling of the cap 12 on the body 10, but also increasing the air resistance while cycling.

In order to rectify the above problem, another type of cycling helmet having a helmet body of polyurethane foam has been proposed. This helmet is shown in FIG. 2. In order to produce this cycling helmet, a separately formed PVC cap 22 is placed in a mold prior to forming the helmet body 20 of polyurethane foam. While forming the helmet body 20 of polyurethane foam, the body 20 becomes integrated with the PVC cap 22 to form a single body. After forming the body 20, a chin strap 21 is coupled to the helmet. In this case, the strap 21 is partially exposed outside the top of the helmet.

An advantage of the above helmet resides in the fact that the cap 22 neither separates from the body 20 nor rattles on the body 20 since the cap 22 is integrated with the helmet body 20 into the single body while forming the body 20. However, this helmet is problematic in that the chin strap 21 is partially exposed outside the top of the helmet. When the chip strap 21 is exposed outside of the helmet, it will increase the air resistance.

The molding temperature of the polyurethane resin used for forming the body 20 is from 35° C. to 40° C. In order to form the helmet body 20, the separately formed PVC cap 22 is first placed in a bottom mold.

After placing the cap 22 in the bottom mold, the polyurethane resin is charged into the bottom mold. Thereafter, the bottom mold is airtightly closed by a top mold, thus forming a mold assembly.

The mold assembly with both the cap 22 and the polyurethane resin in turn pass through a heat chamber heated to about 55° C.–60° C. While passing through the heat chamber, the polyurethane resin is foamed to form the helmet body 20 integrated with the PVC cap 22.

After forming the helmet body 20, the top mold is separated from the bottom mold prior to taking the helmet out of the mold assembly.

SUMMARY OF THE INVENTION

It is, therefore, an object of the present invention to provide a cycling helmet in which the above problems can be overcome and which includes means for coupling the chin strap to the helmet while preventing the strap from being exposed outside the top of the helmet, thereby reducing air resistance.

In an embodiment of the present invention, the chin strap coupling means is a tunnel formed by a strap guide member such as a pipe set in the helmet body of polyurethane foam, the guide member being positioned in its place in a mold while foaming the polyurethane foam.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
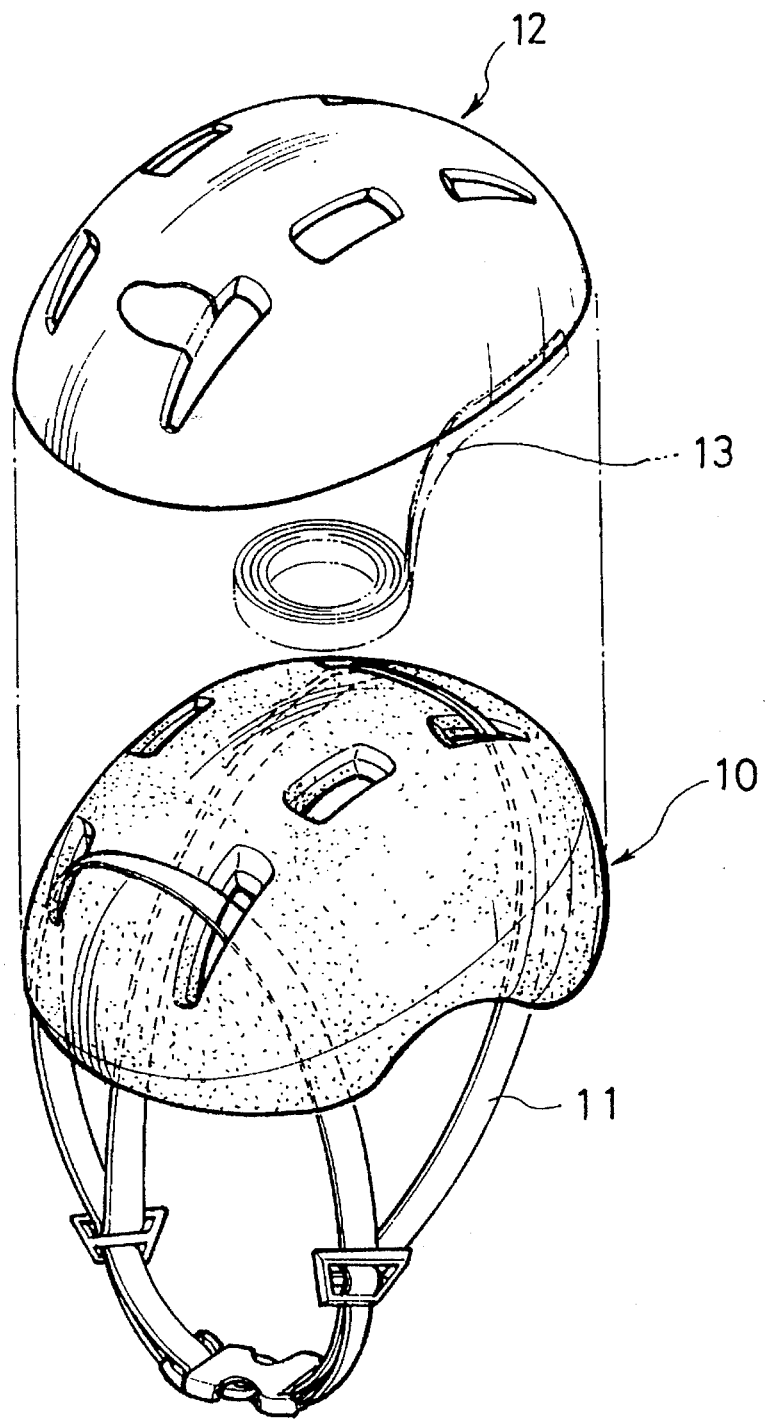
FIG. 1 is an exploded perspective view of a conventional cycling helmet with a styrofoam helmet body.
Figure 2:
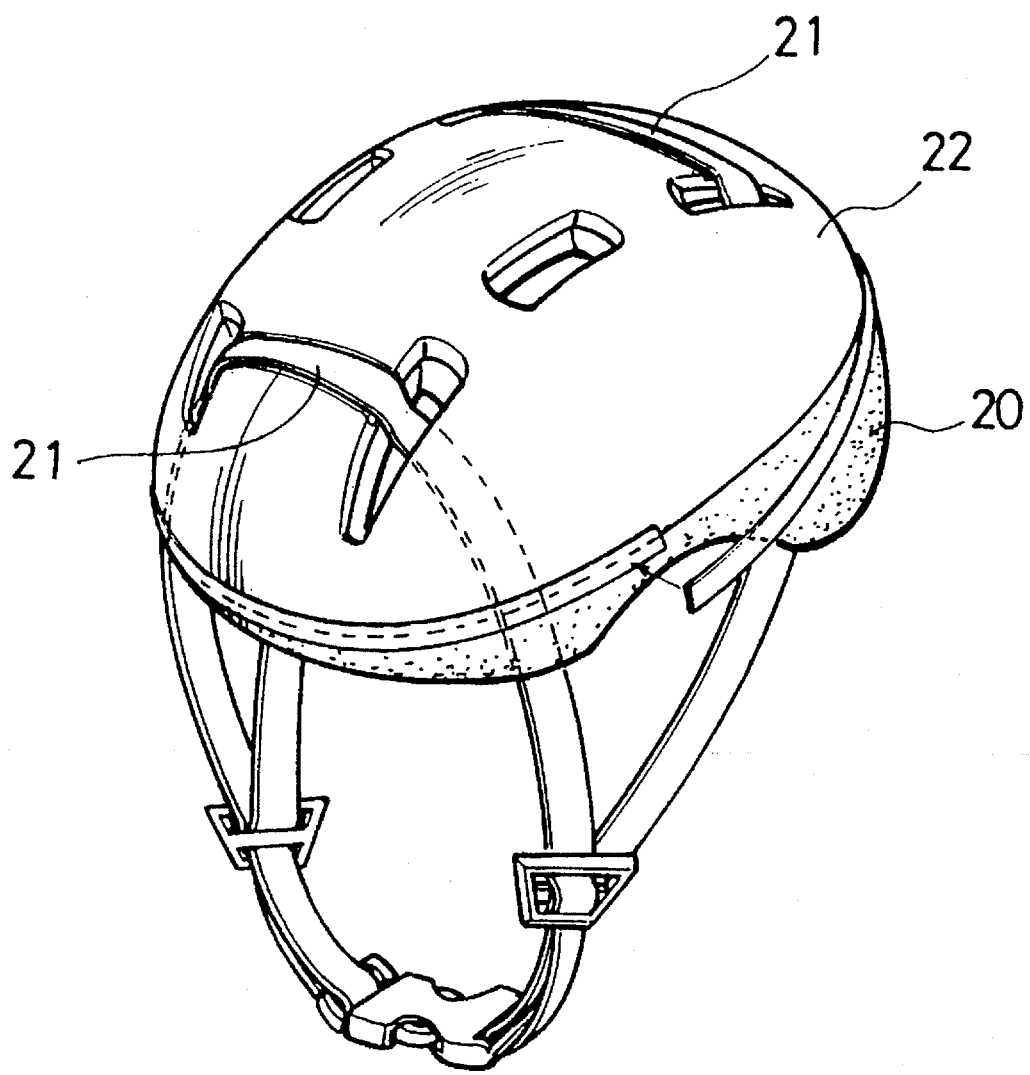
FIG. 2 is a perspective view of another type of conventional cycling helmet with a polyurethane foam helmet body.
Figure 3:
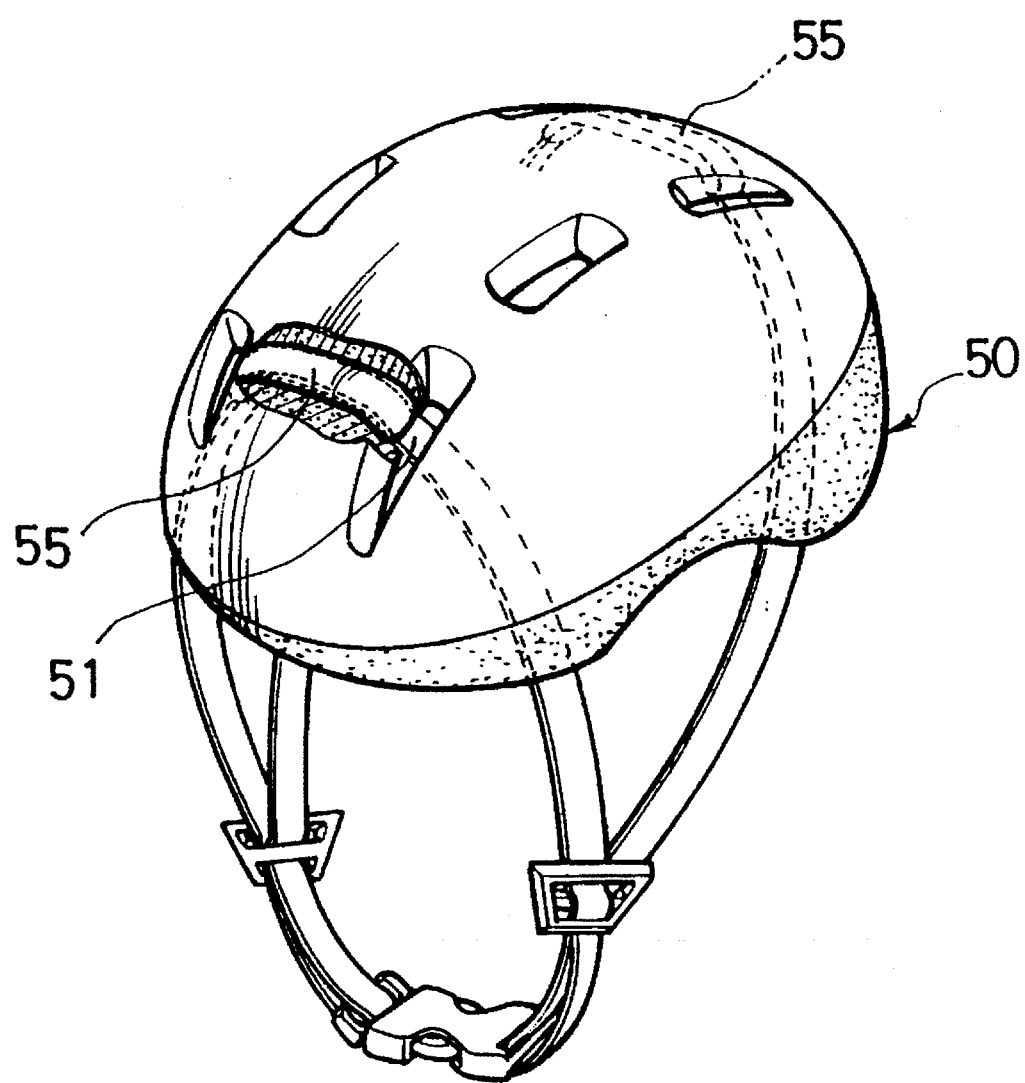
FIG. 3 is a perspective view of a cycling helmet in accordance with a primary embodiment of the present invention.
Figure 4:
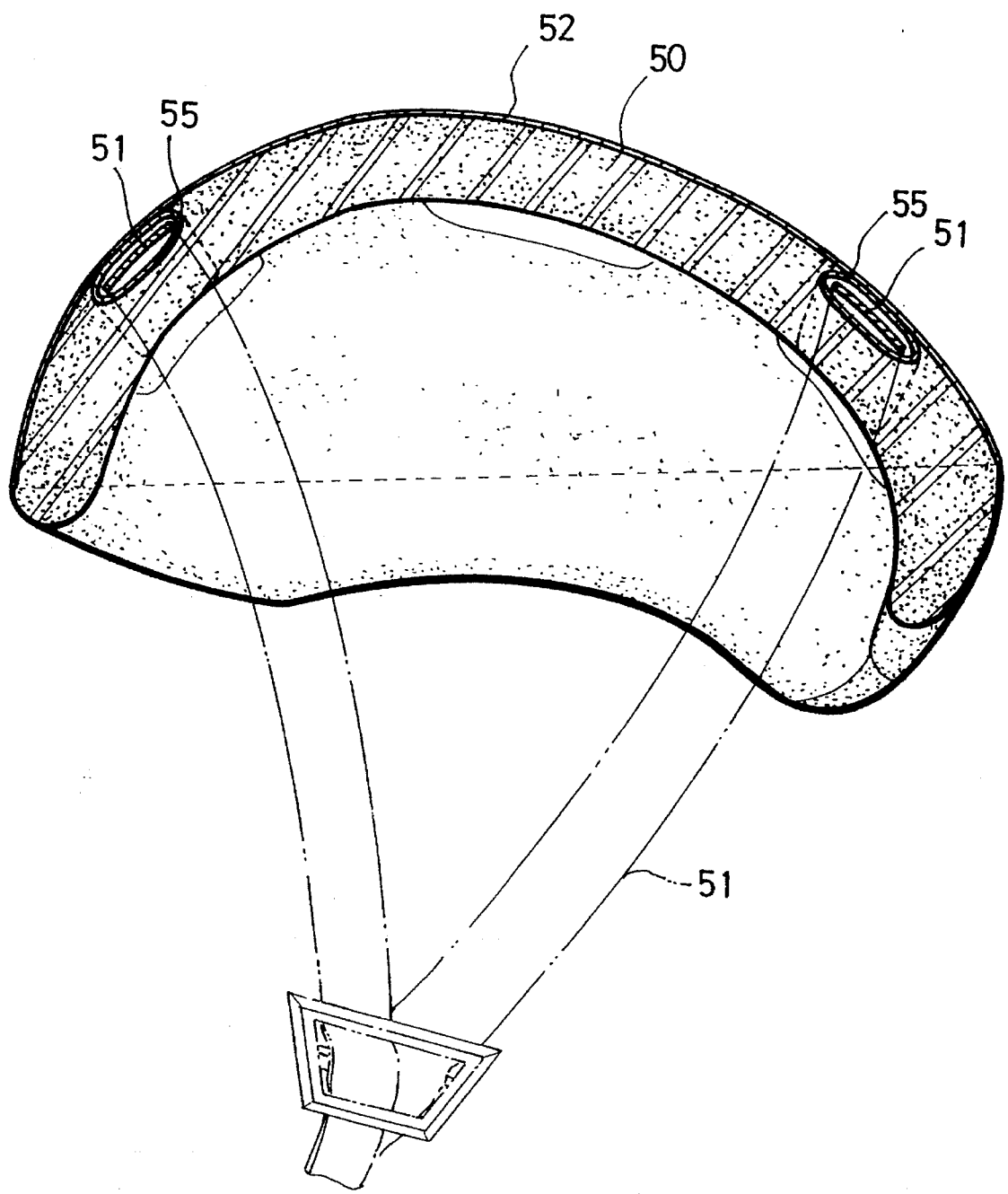
FIG. 4 is a sectional view of the helmet of the present invention.

In order to produce a helmet of invention, a helmet body is formed of polyurethane foam. While the helmet body is formed by foaming the polyurethane foam, the helmet body is integrated with a separately formed PVC cap into the helmet. In the above foaming process, a plurality of strap guide members 55, for example pipes, are positioned in proper places in a top mold. Therefore, the guide members 55 will be set in the helmet body 50 as shown in FIGS. 3 and 4. A chin strap 51 is coupled to the helmet by passing the strap 51 through the tunnels formed by the guide members 55.

Figure 6A:
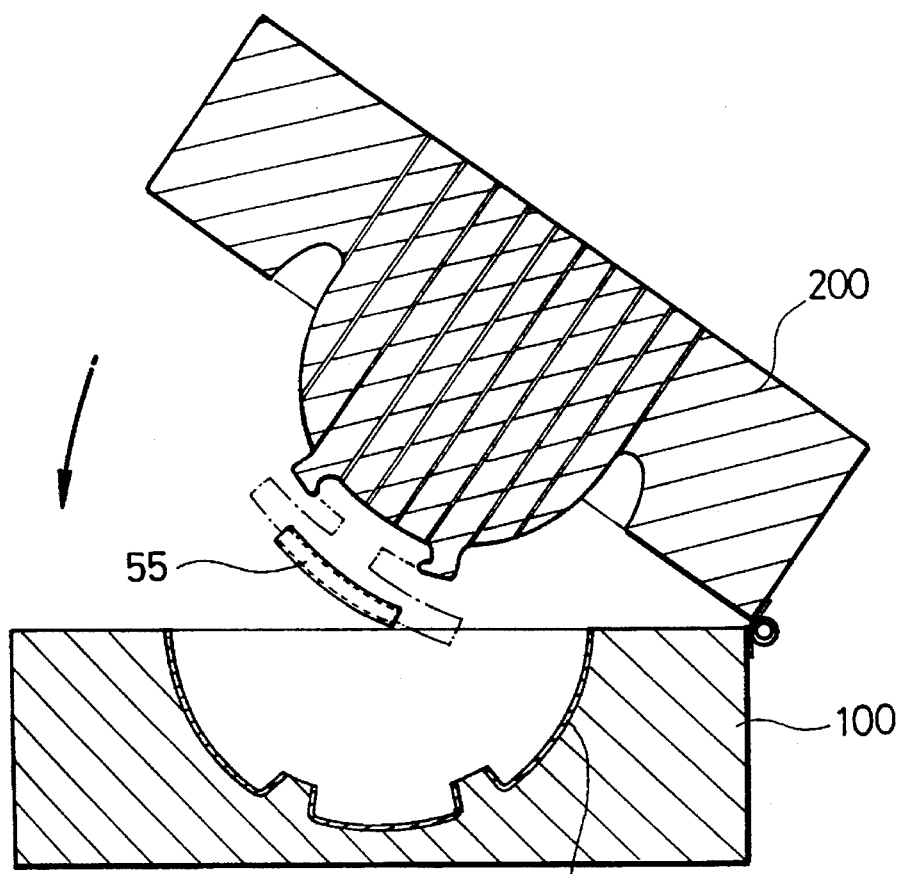
FIGS. 6A and 6B are views showing a forming process for producing the helmet of the present invention.
Figure 6B:
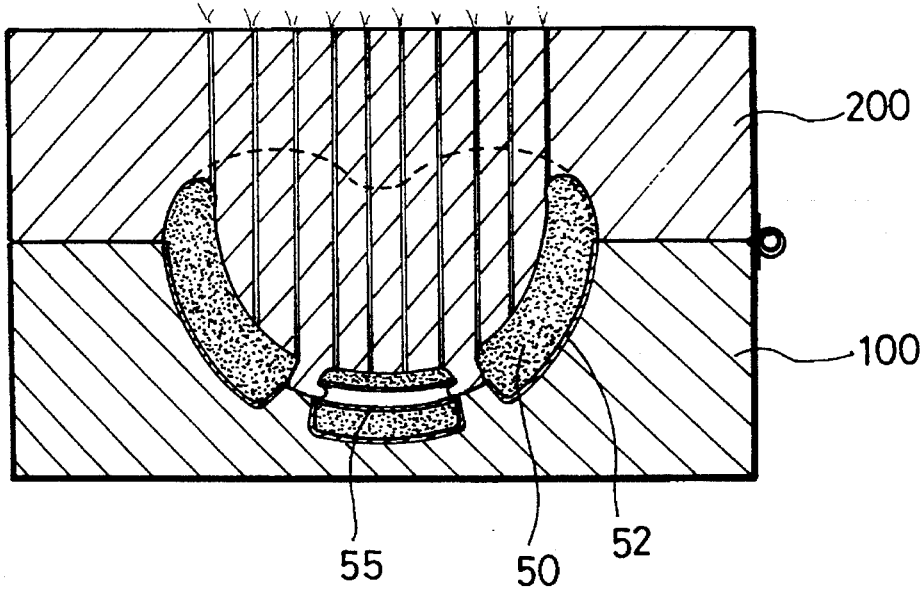

As shown in FIG. 6, a separately formed PVC cap 52 is placed in a bottom mold 100 prior to forming the helmet body 50. Additionally, the guide members 55 such as pipes are positioned in their places in the top mold. In this case, the guide members 55 are positioned in the top mold to allow the chin strap 51 to easily pass through the members 55. The polyurethane resin is charged in the bottom mold 100 where the PVC cap 52 is placed. The bottom mold 100 is, thereafter, airtightly closed by the top mold with the guide members 55. The top and bottom molds in turn pass through a heat chamber heated to 55° C.–60° C., thus foaming the polyurethane resin and forming the helmet body 50 of polyurethane foam. In this case, the guide members 55 are set in the helmet body 55 since the members 55 are positioned in the top mold as described above. While the helmet body 50 is formed of the polyurethane foam, the body 50 is integrated with the PVC cap 52 into a single body. As the guide members 55 for passing the chin strap 51 are positioned in their places in the mold as described above, the guide members 55 for forming the tunnels are set in the helmet body 50. In the above helmet, the top portion of the chin strap 51 is hidden in the helmet within the polyurethane foam body 50.

Alternatively, a plurality of cores applied with a parting agent may be positioned in their places in the polyurethane resin prior to forming the helmet body 50. In this case, the cores are drawn out of the helmet body 50 after forming the body 50, thus forming the tunnels for passing the chin strap 51.

Figure 5A:
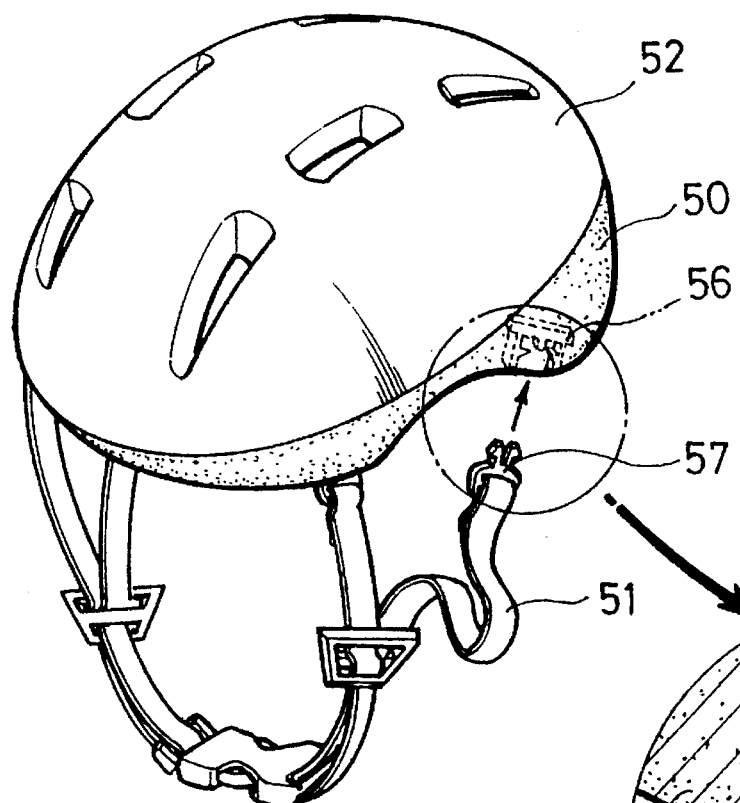
FIG. 5A is a view showing a buckling structure for coupling the chin strap to the helmet body in accordance with another embodiment of the present invention.
Figure 5B:
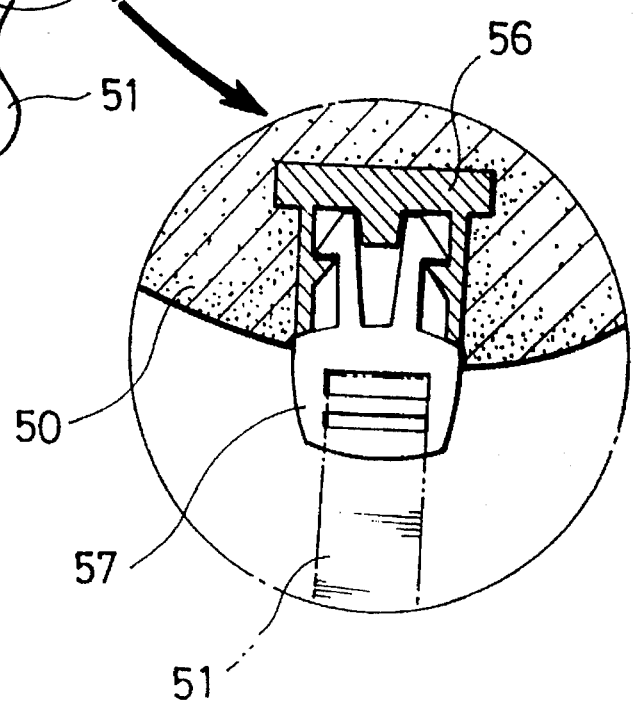
FIG. 5B is an enlarged view of the circled portion in FIG. 5A.

FIGS. 5A and 5B show a buckling structure for coupling the chin strap 51 to the helmet in accordance with another embodiment of this invention. In the present embodiment, a snap buckle receiver 56 is integrally formed in each side edge of the helmet body 50. A pair of detachable snap buckles 57 are coupled to the ends of the chin strap 51. The buckles 57 snap into the buckle receivers 56 of the body 50 respectively, thus coupling the chin strap 51 to the helmet body 50 while preventing the chin strap 51 from being exposed outside the helmet's top.

As described above, the shock absorbing helmet body of the present invention is formed by foaming the polyurethane resin. While forming the helmet body, a separately formed PVC cap is placed in a bottom mold. Additionally, a plurality of strap guide members are placed in their places in a top mold. The PVC cap is integrated with the helmet body into a single body. As the strap guide members are set in the helmet body of polyurethane foam, the chin strap is prevented from being exposed outside the top of the helmet. The helmet of the present invention thus reduces the air resistance and has a pleasant appearance. The present invention thus provides a high quality cycling helmet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cycling helmet having a PVC cap and a shock absorbing helmet body made of polyurethane foam, said helmet body being made integral with the PVC cap during the foaming of the polyurethane foam to form a unitary body, wherein the improvement comprises:

tunnel means provided by strap guide members disposed in said helmet body for coupling a chin strap to said helmet body and preventing said strap from being exposed at the top of the helmet.

2. The cycling helmet according to claim 1, wherein the strap guide member is a core applied with a parting agent in said polyurethane foam while forming said helmet body, said strap guide member being removed after the helmet body is formed.

3. The cycling helmet according to claim 1, wherein a snap buckle receiver is integrally formed in each side edge of said helmet body; and a snap buckle is provided at the end of said chin strap for snapping into said buckle receiver.

* * * * *